United States Patent [19]

McNeely et al.

[11] Patent Number: 4,636,840

[45] Date of Patent: Jan. 13, 1987

[54] ADAPTIVE LUMINANCE-CHROMINANCE SEPARATION APPARATUS

[75] Inventors: David L. McNeely, Indianapolis; Russell T. Fling, Fishers, both of Ind.

[73] Assignee: RCA Corporation, Princeton, N.J.

[21] Appl. No.: 638,993

[22] Filed: Aug. 9, 1984

[51] Int. Cl.[4] .............................................. H04N 9/78
[52] U.S. Cl. ...................................................... 358/31
[58] Field of Search ......................................... 358/31

[56] References Cited

U.S. PATENT DOCUMENTS

| 2,921,124 | 1/1960 | Graham | 178/6 |
| 4,050,084 | 9/1977 | Rossi | 358/31 |
| 4,307,420 | 12/1981 | Ninomiya et al. | 358/136 |
| 4,361,853 | 11/1982 | Remy et al. | 358/167 |
| 4,429,334 | 1/1984 | Hashimoto | 358/31 |
| 4,437,119 | 3/1984 | Matsumoto et al. | 358/136 |
| 4,532,542 | 7/1985 | Andrews | 358/31 |

FOREIGN PATENT DOCUMENTS 2072991 10/1981 United Kingdom .
2138243A 4/1983 United Kingdom .

OTHER PUBLICATIONS

A. Kaiser, "Comb Filter Improvement with Spurious Chroma Detection," SMPTE Journal, vol. 86, No. 1, Jan. 1977, pp. 1-5.

Primary Examiner—Michael A. Masinick
Attorney, Agent, or Firm—E. M. Whitacre; P. J. Rasmussen; E. P. Herrmann

[57] ABSTRACT

Comb filtered video signals having reduced artifacts are adaptively produced by circuitry including delay elements for providing a plurality of video signals delayed by integral numbers of horizontal line periods, for example, signals delayed 1H, 2H, 1 field, 1 frame, etc. Signals from pairs of these lines of signals are compared by developing the sums of cross differences of samples spanning the sample point to be filtered to produce a signal indicative of the pairs of lines having the highest degree of signal correlation at that instant. The pair of lines exhibiting highest correlation are selectively applied to signal combining circuits to generate comb filtered luminance and chrominance signals in the conventional manner.

19 Claims, 14 Drawing Figures

ADAPTIVE LUMINANCE-CHROMINANCE SEPARATION APPARATUS

This invention relates generally to television apparatus and, more particularly, to apparatus for separating chrominance and luminance signal components from composite video signal.

In the early stages of development of video signal processing systems composite video signal was separated into its component parts by band selective filters. Luminance signal was derived by low pass filtering composite video signal and the chrominance component was extracted by band pass filtering composite video. This technique, however, tends to undesirably eliminate the higher frequency spectrum of the luminance signal and fails to eliminate the higher frequency spectrum of the luminance component from the extracted chrominance signal.

Subsequently comb filters have been employed for chrominance-luminance signal separation. Comb filters are capable of producing full band luminance output and of eliminating high frequency luminance signals from the chrominance component.

Comb filters operate on the premise that video signal from horizontal-line-to-horizontal-line or field-to-field or frame-to-frame is highly correlated. When this assumption fails, as it frequently does with program video, certain anomalies occur in the reproduced images. The anomolies result from imperfect cancellation of the chrominance signal in the luminance output signal and vice versa. For example, if there is an abrupt change in the amplitude of the chrominance signal between adjacent lines scintillating serrations will occur along horizontal edges displayed in the image (for line comb filtered signal). These serrations called "hanging dots" are due to incompletely cancelled chrominance in luminance signal. Alternatively, if there is an abrupt change in luminance amplitude between horizontal lines, anomalous color saturation effects will be displayed along horizontal edges. Similar undesirable effects occur in field comb filtered signals and related effects occur in frame comb filtered signals.

Rossi in U.S. Pat. No. 4,050,084 described a method of eliminating some of these effects for interline comb filters. In the Rossi apparatus two delay lines are utilized to make available three successive horizontal lines of video signals. These lines are designated top (T), middle (M) and bottom (B). The lines of signal are combined in various combinations to generate alternate comb filtered signals described by the equations:

$$C = \tfrac{1}{2}[M - \tfrac{1}{2}(T+B)]; \quad Y = \tfrac{1}{2}[M + \tfrac{1}{2}(T+B)] \quad (1)$$

$$C = \tfrac{1}{2}(M - T); \quad Y = \tfrac{1}{2}(M + T) \quad (2)$$

$$C = \tfrac{1}{2}(M - B); \quad Y = \tfrac{1}{2}(M + B) \quad (3)$$

where C is equal to the separated chrominance component and Y is the separated luminance component. The system operates by sampling and averaging, with particular weighting coefficients, three picture elements from three adjacent lines in the case of algorithm (1) and two picture elments from two adjacent lines in the case of algorithms (2) and (3). Algorithm (1) is desirably used whenever the chrominance signal or the luminance signal on the three successive lines is reasonably correlated. Alternatively if there exists a chrominance transition between lines T and M or between lines M and B then algorithms (3) and (2) respectively will generate more desirable comb filtered signals. The Rossi apparatus adaptively switches between algorithms as a function of signal content. To this end, comparator circuitry is employed to compare corresponding vertically aligned samples (relative to the displayed image). For example, if the comparison shows that the signal content of T is approximately the same as the signal content of M, but different from the signal content of B, i.e. $||M| - |T|| \leq$ reference and $||M| - |B|| >$ reference, then the system selects algorithm (2).

The selection mechanism successively compares single samples from each of three lines and thus is highly susceptible to errors due to noise. Secondly, the selection process is a function of an arbitrary reference value, which tends to render it's effectiveness variable for different signal conditions. Thirdly, the number of possible luminance/chrominance separation algorithms are limited in number.

It is apparent that a major aspect of an adaptive luminance/chrominance separation system is the decision process, i.e. when to use which of the alternate signals. Severe artifacts and picture degradation may result if the wrong separated luminance/chrominance signal is used or if alternatives are selected at improper times. The decision process depends on an estimation of some parameter of the signal being processed. A main goal is to maintain the integrity of signal transitions regardless of orientation. If luminance goes from black to white and then back to black, the two transitions should be mirror images of each other. The adaptive system should not be biased to the direction of the transition.

SUMMARY OF THE INVENTION

The present invention is directed toward video signal processing apparatus for separating luminance and chrominance components therefrom. Video signal is applied to one or more delay elements from which a plurality of video signals respectively delayed from each other by integral horizontal line periods is available. Pairs of the delayed video signals are coupled to respective detection circuits which develop the sums of cross differences of samples, which cross differences are derived from signal samples between lines and about a particular sample point. A decoder is coupled to the respective detection circuits which generates a control signal indicative of the sum of cross differences having the smallest value. The control signal is applied to selection circuitry for selecting a preferred one of alternate luminance-chrominance separation functions.

DETAILED DESCRIPTION

Figure 1:
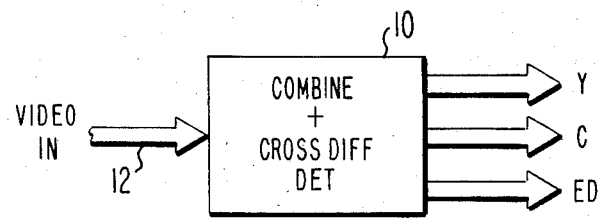
FIG. 1 is a block diagram of circuitry for generating separated chrominance and luminance signals from composite video plus a detection signal related to the correctness of the separated signals.

In the following description it will be assumed that the signals to be processed are paralleled bit digital signals (e.g. binary samples). The circuitry shown in the drawings therefore includes digital arithmetic elements, however, the principles discussed are equally applicable to analog and analog sampled data signals.

Referring to FIG. 1, an element 10 is shown having an input port for applying video signal and Y and C output ports at which separated luminance and chrominance components are available. Element 10 also has an output port, ED, at which a signal related to the correctness of the separated Y and C signals is available. Assume that the smaller the value output at port ED the more likely that the signals output at ports Y and C are correct.

Circuit element 10 may include delay lines and signal combining circuits coupled to the delay lines, e.g. comb filters, to produce separated luminance and chrominance signals from composite video. However, a given element 10 may perform signal separation by other means.

Consider that element 10 does include a comb filter. The comb filter may be one of a variety of types, e.g. 1H-interline, 2H-interline, interfield, interframe, etc. For a given video signal the goodness or correctness of the separated Y and C signals will vary among the filter types depending on signal content. In order to have the best separated signals at all times a variety of alternative signals is made available by combining a number of filter elements in parallel.

Figure 2:
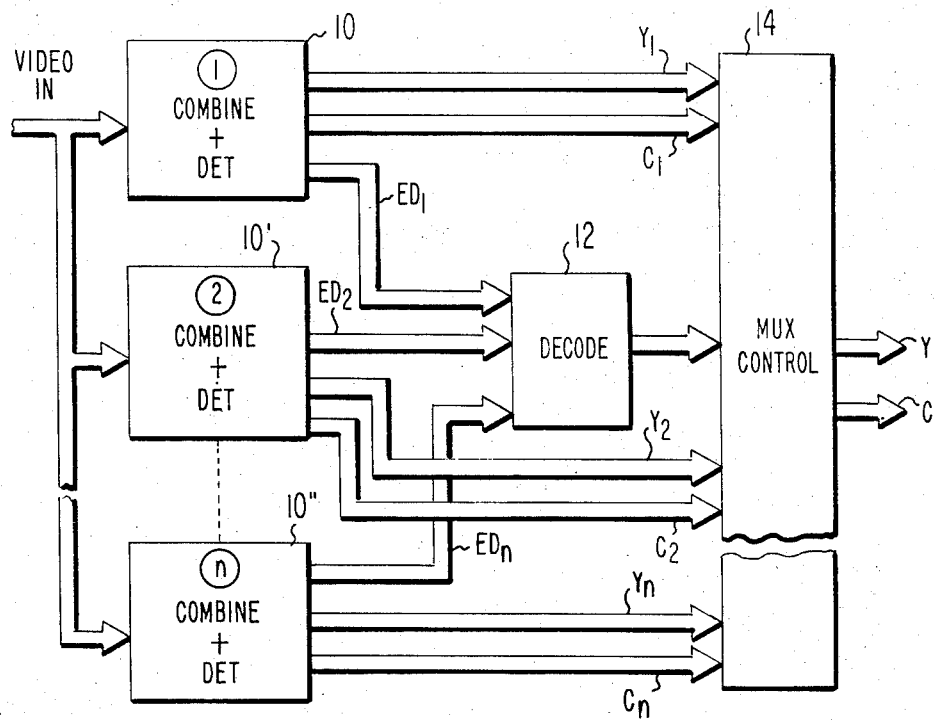
FIG. 2 is a block diagram of an adaptive signal separation apparatus incorporating a number of the FIG. 1 signal separation elements.

In FIG. 2 a variety of element 10 type luminance/chrominance separation elements are paralleled.

For example, element 10 may be a 1H interline comb filter responsive to horizontal lines n and n+1, element 10' may be a 1H interline comb filter responsive to horizontal lines n and n−1, and element 10" may be an interfield comb filter responsive to horizontal lines n and n+263. In general each of elements 10, 10', 10" will respond to at least one common horizontal line of signal (in this instance line n) to minimize discontinuities during signal or filter selection. The output signals from these elements are selectively coupled to buses Y and C by multiplexor 14 for further processing in elements not shown. Multiplexor 14 operates under the control of a decoder circuit 12 operatively controlled by the estimate of correctness signals generated on output buses, ED, of the respective circuits 10. Decoder circuit 12 compares the signals produced on buses $ED_1$ to $ED_n$ and generates a control signal for multiplexor 14 to select the $Y_i$ and $C_i$ signals from the element 10 generating the smallest estimation signal.

Figure 3A:
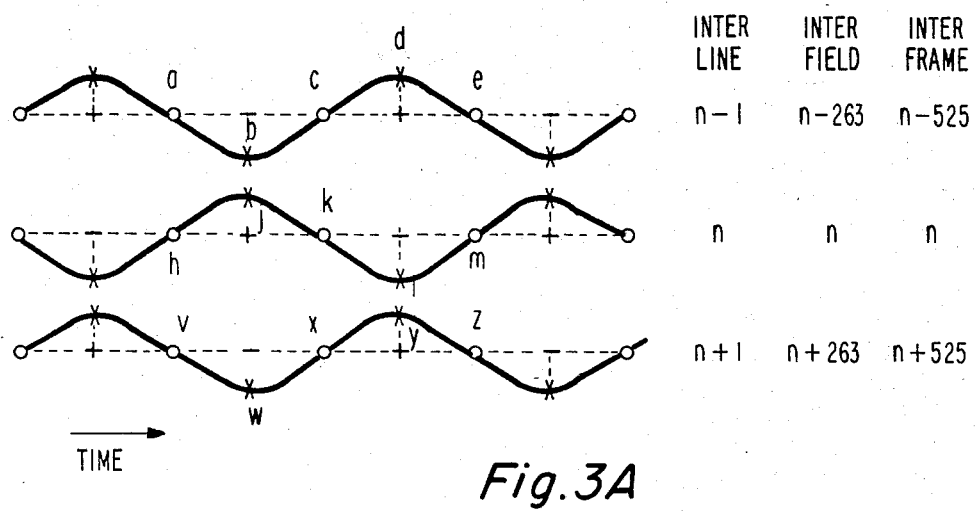
FIGS. 3A, 3B, 4, 7 and 10 are graphical representations of portions of lines of video samples to illustrate samples involved in the estimation process.
Figure 3B:
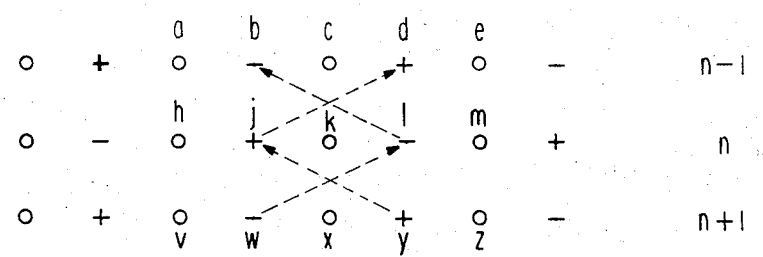

The generation of the estimation signal will be described with reference to FIGS. 3 and 4. FIG. 3A is a waveform diagram of portions of three horizontal lines. IF an interline comb filter is employed the three lines are three successive lines in one image field. If a field comb filter is employed the lines are separated by one field plus one-half line (i.e. 263 lines) etc. The signal is drawn as a sinusoid to represent the relative phase of the chrominance signal between lines. The signal is assumed to be sampled at four times the chrominance subcarrier rate with representative sampling points designated +, 0, −, 0, +, etc. The (±) points designate sampling points at the positive and negative phase excursions. The 0 points designate sample points at the zero crossings. However, the 0 sample points do not necessarily have zero values since the video signal is a composite of chrominance and luminance signal. Nor is it necessary that sampling be performed at the phases shown. FIG. 3B corresponds to FIG. 3A with the waveforms eliminated for purposes of clarity.

In the comb filtering process, lines with antiphase chrominance components are added to produce the separated luminance signal. If the amplitude of the chrominance component is identical on both lines, the chrominance component is cancelled completley from the separated luminance component. Lines with antiphase chrominance components are subtractively combined to produce separated chrominance signal. If the amplitude of the luminance component is identical between the lines combined the luminance component is completely cancelled in the separated chrominance signal. As the chrominance and luminance components differ between lines the amount of cancellation of the undesired component in the respective separated signals is affected.

An estimation of how good or how bad the comb filtering process will be may be determined by comparing the amplitudes of the samples being combined. This is done by taking the cross differences of like phase samples in the proximity of the samples being combined. For example, the difference between sample "d" and sample "j" (FIG. 3B) is determined. In addition, the difference between sample "l" and sample "b" is determined. If the differences are zero there is a high probability that the amplitude of the luminance and chrominance signal components at sample points "c" and "k", which fall between the examined samples, are equal and if combined will produce perfectly separated luminance and chrominance signals. The figure of merit or estimation of correctness for a given filter is the average or mean of the differences. This average or mean may be determined by taking the square root of the sum of the squares of the differences, i.e. the square root of $[(V(l)-V(b))^2+(V(j)-V(d))^2]$ where V( ) is the value of the sample designated in parenthesis. However, this is a complicated process to perform at four times subcarrier rate. Therefore, a simple sum of the differences is more appropriate. The sum may be halved to give a true average, but this is unnecessary if like determined estimates are to be compared.

A FIG. 1 type element 10 utilizing horizontal lines n and n−1 to produce separated luminance and chrominance signals at pixel point "K" or "C" would include circuitry to determine the sum of the differences (V(j)−V(d))+(V(l)−V(b)). Similarly, a circuit element 10 operating on horizontal lines n and n+1 would include circuitry to determine the sum of the difference (V(w)−V(l))+(V(y)−V(j)). A system configured as in FIG. 2 including only these two element 10 type blocks would respond on a sample by sample basis to the element 10 circuit producing the smallest estimation value, i.e. the smallest sum of cross differences.

Because the estimation signal is determined with reference to four samples its sensitivity to noise is reduced with respect to a two sample estimate. Conversely, it is more sensitive to the occurrence of diagonal images which tend to defeat the comb filter process. Thus, the system will tend to produce more accurate responses along reproduced images of diagonal lines.

Figure 4:
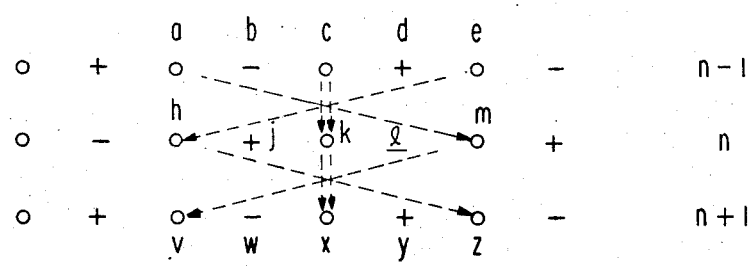

FIG. 4 illustrates an alternate estimation algorithm which employs six samples in the estimate. In this algorithm two sets of samples are used to produce cross differences, and the difference between the vertically aligned samples at the current sample point is taken. The double arrow between the vertically aligned samples indicates that this difference is given double weight in the sum of differences corresponding to the estimation signal. For example, an element 10 operation on e.g. horizontal lines n and n−1 developes the differences −V(m)−V(a), −V(h)−V(e), and 2(V(c)+V(k) and then sums the differences to develop the estimation signal for the combining of samples c and k to develop separated luminance and chrominance signals corresponding to e.g. pixel k. Since six samples are utilized, the estimation is less sensitive to noise on a given sample than for the instance when two or four samples are used.

Note that in determining this set of differences the polarity of the samples is inverted before taking the differences because the chrominance component of the pairs of samples is antiphase.

Figure 5A:
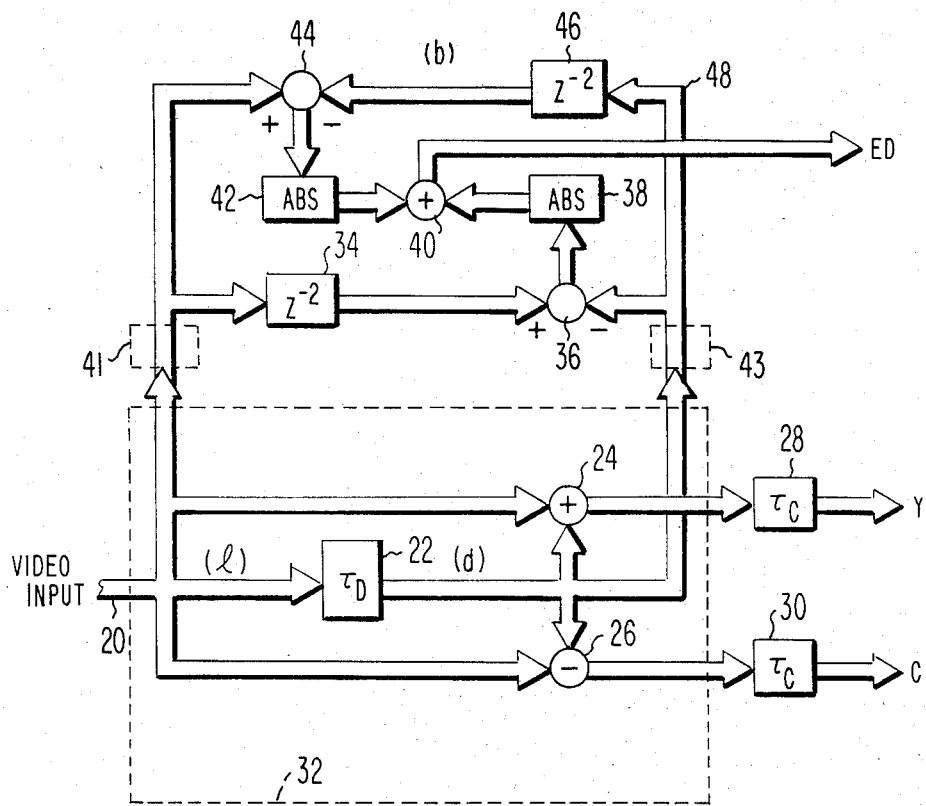
FIGS. 5A, 5B, 6 and 11 are block diagrams of combined chrominance/luminance separation and estimation circuits.

FIG. 5a is a block diagram of one example of circuitry for realizing element 10 of FIG. 1. The circuitry 32 circumscribed by the broken line is a conventional comb filter and includes a delay element 22 and signal combining means 24 and 26. For interline comb filters, delay element 22 may be a 1H delay line. For interfield and interframe comb filters, delay element 22 may be a delay line of 263 horizontal lines and 525 horizontal lines respectively. In circuitry 32, delayed and nondelayed signals applied at input port 20 are combined in adder 24 and subtracter 26 to generate separated luminance, Y, and chrominance, C, signals respectively.

The circuitry above box 32 is the estimation signal detector. Assume for the present discussion that the elements shown as dashed boxes 41 and 43 are direct connections. Assume further that element 22 is a 1H delay element and that sample 1 (FIG. 3) is being applied to input 20. Then sample d is present at the output of 1H delay element 22 on bus 48. To perform the cross differences indicated in FIG. 3B two samples from each of two successive lines are required. Samples 1 at input port 20 and samples d on bus 48 are two of the requisite samples. A third sample, j, preceding sample 1 by two sample periods, is provided by delay element 34 coupled to input port 20. The fourth sample, b, is provided by delay element 46 coupled to bus 48.

Samples d, on bus 48 are applied as subtrahends to one input of subtraction circuit 36 and samples, j, from delay element 34 are applied as minuends to subtraction circuit 36. Subtraction circuit 36 produces the first cross difference signal V(j)−V(d). Similarly subtraction element 44 coupled to input port 20 and delay element 46 produces second cross differences V(l)−V(b). The cross differences from subtraction circuits 36 and 44 are coupled to an adder circuit 40, the output, ED, of which is the sum of the cross differences or the estimation signal. It is possible that the first and second cross differences are of approximately equal value but opposite polarity. In this instance the sum of cross differences, ED, will register an approximately zero estimation signal. This may be an erroneous indication of correct separated signals being provided by the signal separation circuitry 32.

To preclude this occurrence it may be desirable to sum only the magnitudes of the cross differences. In this instance, absolute value circuits 38 and 42 are respectively interposed between the subtraction circuits 36 and 44 and the adder circuit 40.

The FIG. 5a circuitry includes compensating delay elements 28 and 30 serially connected in the comb filter output buses. These delay elements compensate for the delay incurred in generating the estimation signal and appropriately temporally align the separated luminance and chrominance signals with their respective estimation signals.

If it is desired that the estimation signals be primarily a function of only chrominance differences, then bandpass filters may be included in elements 41 and 43. Alternatively, if the estimation signal is to be a function of only luminance differences, then lowpass filters may be included in elements 41 and 43.

Figure 5B:
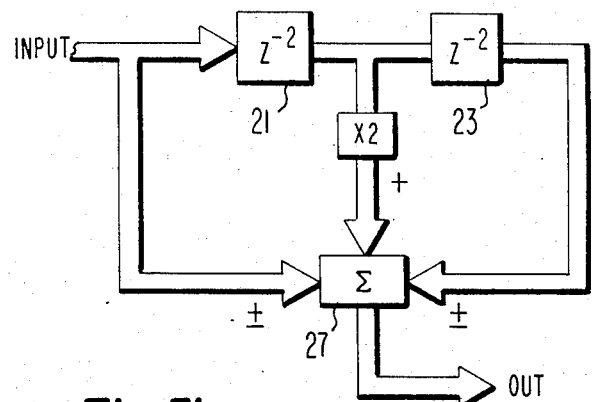

FIG. 5b shows a bandpass or lowpass type filter which may be included in elements 41 and 43. Those skilled in the art of digital TV design will recognize the filter as a finite impulse response digital filter designed to operate on video samples occurring at four times subcarrier rate. If the (±) input ports to combining element 27 are selected to be (+), the filter attenuates chrominance components. Alternatively, if the (±) input ports to element 27 are selected to be of a (−) sense, i.e. complementing, then the filter tends to attenuate luminance components.

Figure 6:
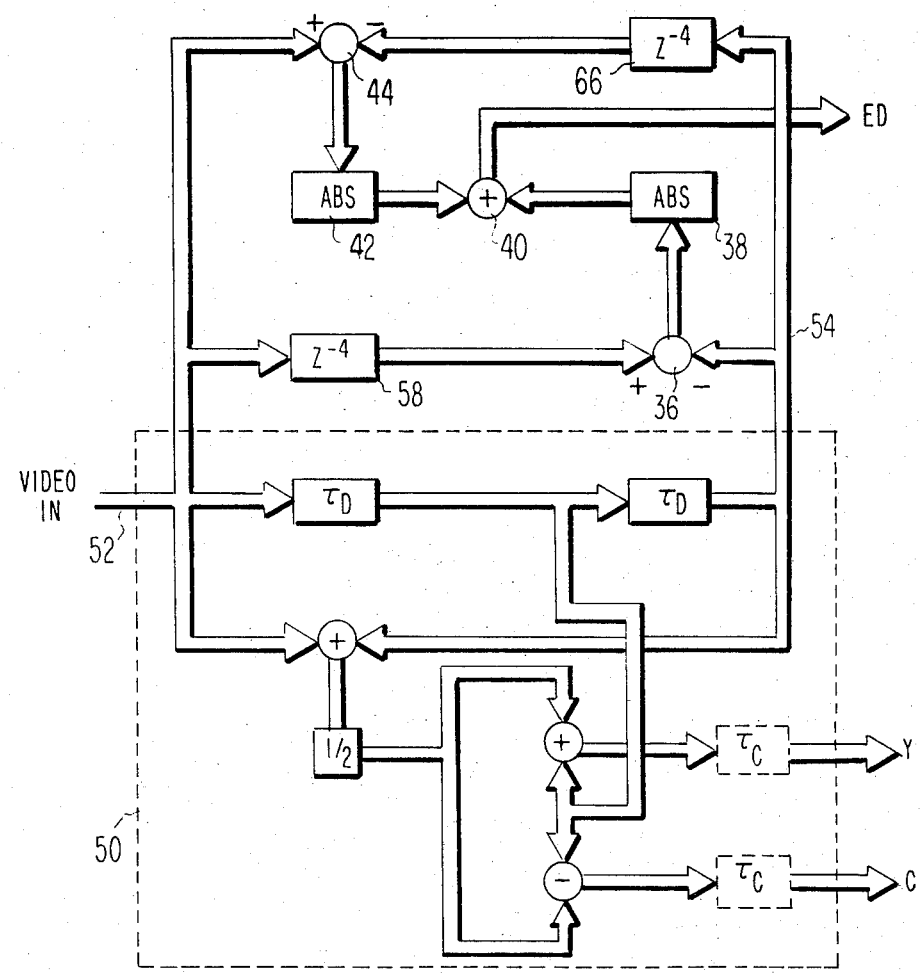

FIG. 6 illustrates a slightly different embodiment of an element 10 (FIG. 1) circuit including a 2H comb filter, 50, for providing separated luminance and chrominance signals. (Comb filter 50 may also be a two field comb filter, etc. with the appropriate choice of delay elements τD.) As shown the 2H comb filter is of conventional design and will not be described further.

Figure 7:
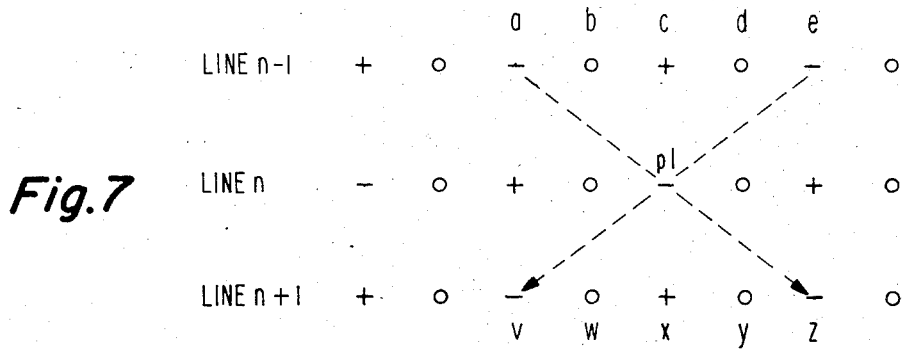

2H comb filters operate on three lines of signal and therefore the estimation signal should be related to those three lines. FIG. 7 indicates the sample points from which the cross differences are derived for the FIG. 6 circuit. The estimation signal ED($P_1$), for filtered output signals corresponding to pixel point $P_1$, is given by the equation:

$$ED(P_1)=[V(e)-V(v)]+[V(a)-V(z)]. \qquad (4)$$

The algorithm involves four samples and the differences span three lines. The algorithm ED ($P_1$) subtracts like phase samples. Since horizontal lines n−1 and n+1 have like phase chrominance subcarrier, the subtraction must span five samples in the horizontal direction, i.e. samples e to a and samples z to v. The circuitry to perform the algorithm is illustrated above box 50 is FIG. 6 and will be recognized to be similar to the FIG. 5 detection circuitry. The only difference is that the delay elements 58 and 66 delay applied samples by four sample periods rather than two to provide the proper sample alignment.

Figure 8:
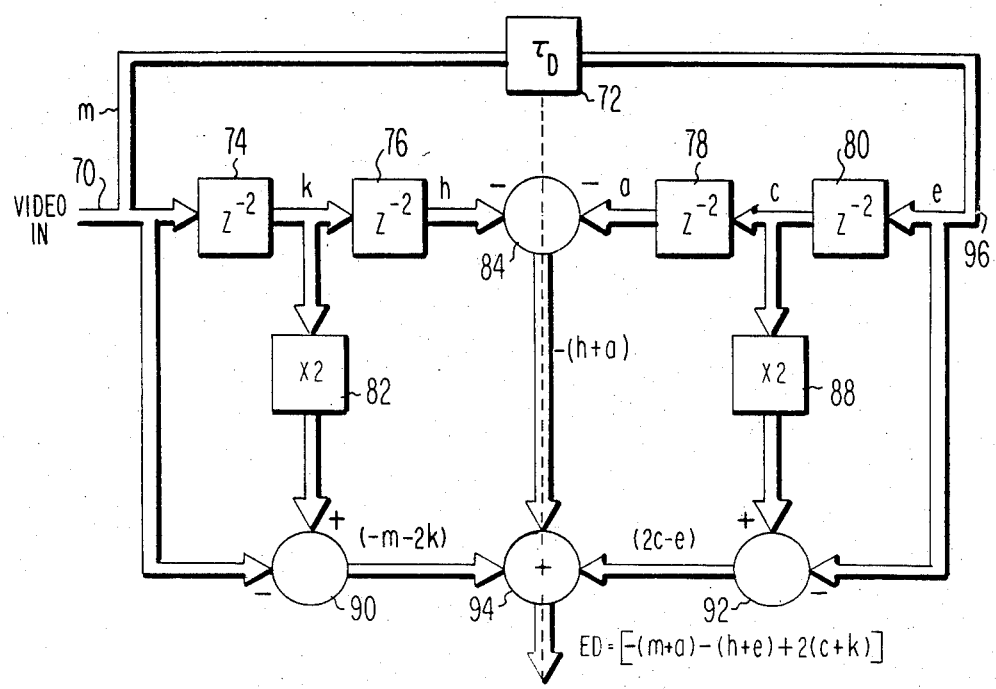
FIGS. 8 and 9 are block diagrams of two additional estimation circuits.

FIG. 8 illustrates estimation signal detection circuitry which performs the algorithm indicated in FIG. 4 for e.g. horizontal lines n and n−1. Circuitry to develop the sum of the cross differences from six samples may be designed as a simple extension of the FIG. 5 detection circuitry. However, such an arrangement results in excess hardware. By judicious selection of circuitry the appropriate samples that occur in the sum of cross differences are made available with the minimized hardware illustrated in FIG. 8. The circuit elements of FIG. 8 include four two-sample period delay elements 74–80, two multipliers 82 and 88, one adder 94, three subtracters 84, 90 and 92 and delay element 72. Delay element 72 provides the requisite number of horizontal line period delays, e.g. 1H line period for a 1H comb filter, 263 line periods for a field comb, etc. Finally, if the signals being processed are binary signals, multipliers 82 and 88 may be simple hardwired bit shifts to shift the sample bits leftward one significant bit position.

Referring to FIG. 4 and FIG. 8, assume that the sample currently being applied to input port 70 is sample m. Then samples h and k respectively applied 4 and 2 sample periods earlier will occur simultaneous with sample m but at the output ports of serially connected delay elements 76 and 74. Sample e from the previous line, which was delayed in element 72, is concurrently present on bus 96, and is coupled to the input port of serially connected delay elements 80 and 78. Samples a and c which occurred respectively four and two sample periods before sample e, and which have been delayed in delay elements 78 and 80, are simultaneously available at the output ports of delay elements 78 and 80. The samples k from delay element 74 are multiplied by the factor 2 in multiplier 82 and are subtracted from the value of samples m in subtracter 90. Samples e are subtracted from twice the value of sample c in subtracter 92. Samples a from element 78 are subtracted from samples h, from delay element 76, in subtracter 84 and the output values from subtracters 84, 90 and 92 are additively combined in adder 94. The output value, ED, of adder 94 is given by:

$$ED = [(-V(m) - V(a)) + (-V(h) - V(e)) + 2(V(c) + V(k))] \quad (5)$$

which is the desired sum of cross differences. An interesting feature of this detection circuit is that it is substantially unaffected by low frequency luminance changes. Examining the circuitry on either side of the line of symmetry (the dashed line through the center of the circuit), one skilled in the art of digital signal processing will recognize that the combination of elements on either side of the line is a finite impulse response bandpass filter with a center frequency at color subcarrier frequency. As such, the bandpass filters tend to attenuate the luminance components outside of the chrominance band. The estimation signal provided by the FIG. 8 apparatus tends, therefore, to be only a function of chrominance changes.

Under certain signal conditions, e.g. when the chrominance signal is 180 degrees out of phase between horizontal lines (i.e. the signal phase relative to the subcarrier phase), the estimation detector of FIG. 8 may undesirably produce small or zero values on alternate sample points. Thus, it may be advisable to average estimation signal samples ED. One example of such an averaging algorithm is given by the equation $$ED_A = ED_{S-1} + 2ED_S + ED_{S+1} \quad (7)$$

where $ED_A$ is the average estimation signal sample for sample S and $ED_{S-1}$, $ED_S$ and $ED_{S+1}$ are three consecutive samples provided by element 94. This algorithm may be performed by a circuit similar to that shown in FIG. 5b. For this application the delay elements 21 and 23 of FIG. 5b will be one sample period delay elements and the (±) inputs to combining element 27 will be of the positive (+) sense.

Figure 9:
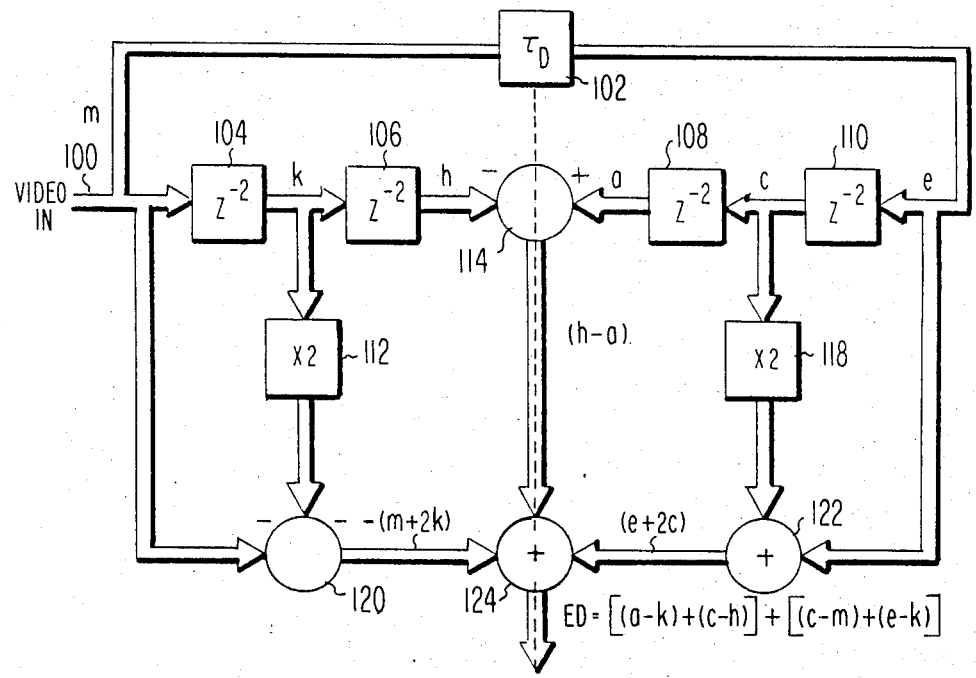
Figure 10:
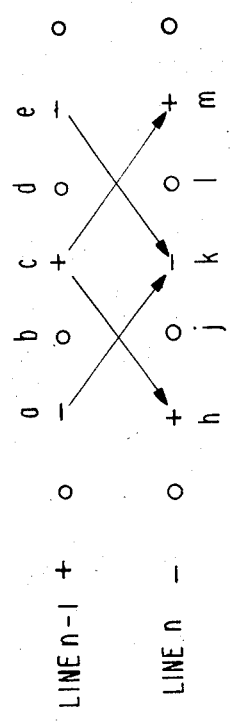

FIGS. 9 and 10 illustrate alternatives to the FIG. 8 circuit and FIG. 4 algorithm. In FIG. 10 the cross differences are taken in the sense that samples from line n are subtracted from samples from line n−1 whereas in FIG. 4 respective samples from lines n and n−1 are subtracted from samples from lines n−1 and n.

The FIG. 9 circuit is similar to that of FIG. 8 with the exceptions that element 114 which corresponds to negative adder element 84 in FIG. 8 is a subtraction circuit; 120 which corresponds to subtraction element 90 is a negative adder; and element 122 which corresponds to subtraction element 92 is an adder. The sample values, ED, available from adder 124 correspond to the sums of cross differences given by:

$$ED = [(-V(a) - V(k)) + (V(c) - V(h))] + [(V(c) - V(m)) + (-V(e) - V(k))]. \quad (8)$$

If the FIG. 9 circuit is divided in half to produce right and left hand circuits as was considered for the FIG. 8 circuit, the right and left half circuits correspond to respective finite impulse response low pass filters. The transfer function of the respective filters tend to cut off below the chrominance frequency spectrum. Thus, the FIG. 9 circuit tends to be senstive to changes of only the luminance component of signal applied at input port 100.

Estimation signal samples derived from either the FIG. 8 or FIG. 9 apparatus should be processed through a magnitude detector before application to the decoder circuitry.

Figure 11:
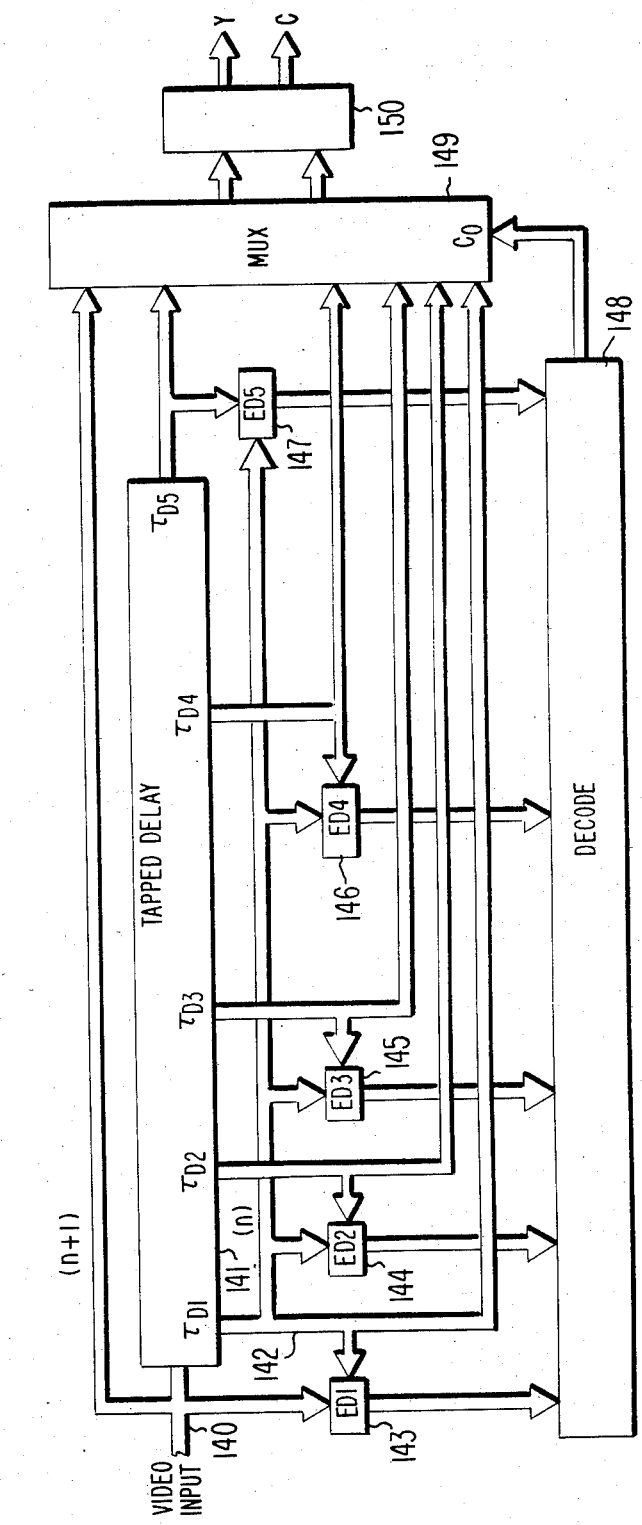

FIG. 11 is an alternative signal separation circuit operating on the aforedescribed principles. Video signal is applied at input port 140 to a tapped delay line 141 having output taps $\tau_{D1}$-$\tau_{D5}$. The input port and each of the output taps are coupled to parallel input ports of a multiplexor 149. Multiplexor 149 having e.g. two output ports applies signal to circuit 150 which processes the signal from multiplexor 149 to produce separated luminance and chrominance signals Y and C. Circuit 150 may include and adder circuit and a subtraction circuit for combining the signals supplied by the multiplexor as in a conventional comb filter.

The input port and the output taps are coupled to respective estimation signal detection circuits 143-147 the output ports of which are coupled to a decode circuit 148. Decode circuit 148 responsive to the estimation signals from circuits 143-147 outputs a control signal indicative of which estimation signal has the smallest value. The control signal from decode circuit 148 is applied to the multiplexor 149. Responsive to the control signal, the multiplexor selects the appropriate signals applied to its input ports for application to circuit 150.

Each of the estimation signal detection circuits 143-147 have a common input signal supplied from tap $\tau_{D1}$ on bus 142. The separated luminance and chrominance signals therefore correspond to signal temporally related to signal from tap $\tau_D$. Assume taps $\tau_{D1}$ and $\tau_{D2}$ provide signals delayed respectively one and two horizontal line periods from signal applied to input port 140. Then signals corresponding to three successive video lines (n+1), n and (n−1) are available at the input port 140, tap $\tau_{D1}$ and tap $\tau_{D2}$. Separated chrominance and luminance signals may, therefore, be produced by combining samples from lines n and (n+1), lines n and (n−1) or lines n, (n+1) and (n−1). Assume further that tap $\tau_{D3}$ provides signal delayed 264 line periods from signal applied to input port 140. Separated chrominance and luminance signals may, therefore, also be generated from the combination of samples from lines n and (n−263), i.e. field combed signals. Tap $\tau_{D4}$ may provide signals delayed 526 line periods so that frame comb filtered signals may be produced, etc.

In order that the control signal from decoder 148 correspond in time to the appropriate pixels delivered by the output taps to the multiplexor 149 it may be necessary to include compensating delays in series with the multiplexor input ports. The system as described implies the ability to switch between signals on a sample-by-sample basis. However, it may be desirable in some applications to switch on a line-by-line or field-by-field, etc., basis. In this instance it may be appropriate to include accumulators between the detection circuits 143–147 and the decoder. With this modification the decoder would operate on the average estimation signals over e.g. a line or field period.

The detection circuits 143–147 may all be similar as, for example, the detector described with respect to FIG. 5. Alternatively, the detectors may differ from one another with particular ones designed as in FIG. 5 and other designed in accordance with e.g. FIG. 8 or 9.

Figure 12:
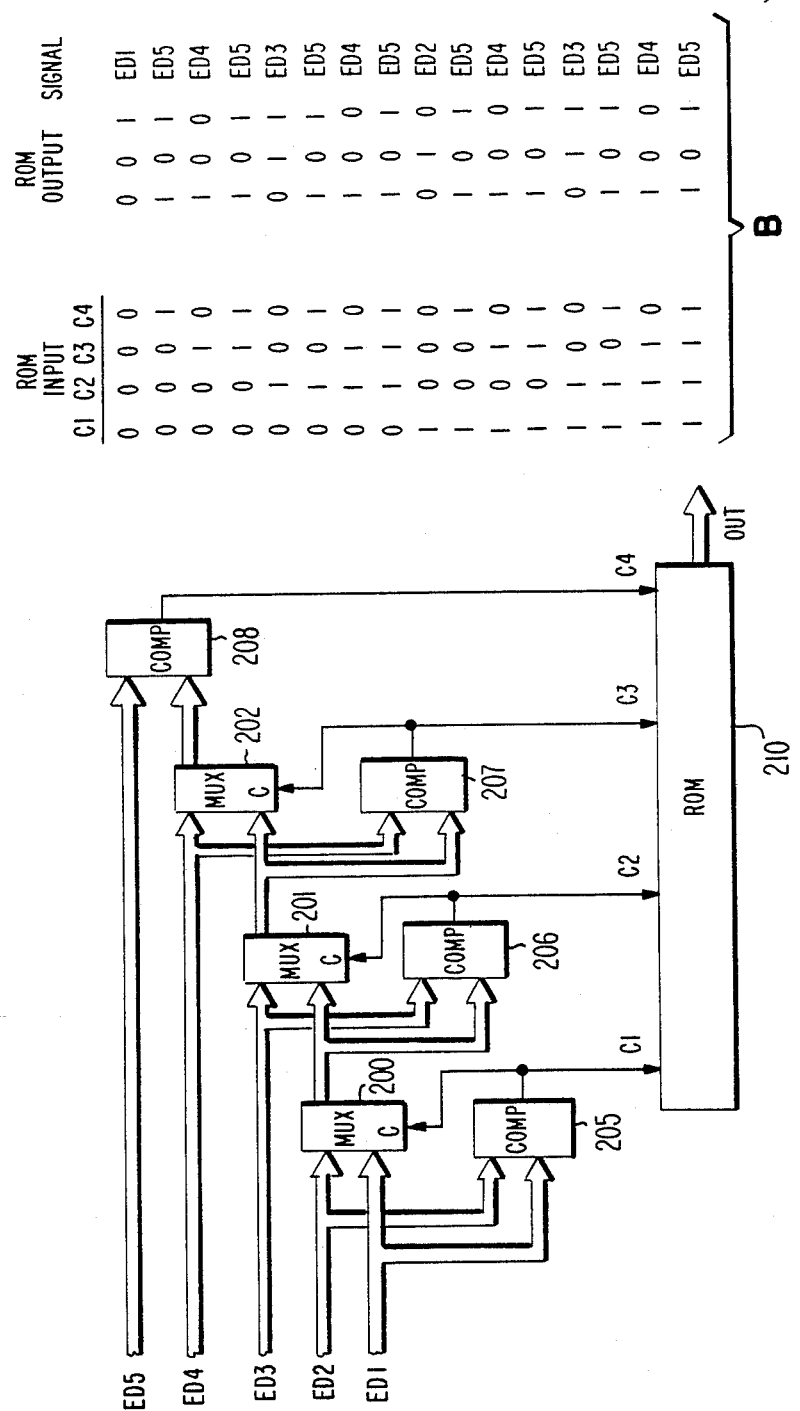
FIG. 12 is a block diagram of a decoder for use in the FIG. 2 and FIG. 11 apparatus.

FIG. 12A shows exemplary circuitry which may be used for decoders 12 or 148. The circuit shown is for determining which of five estimation signals (magnitudes) is the smallest but may readily be expanded to greater numbers of estimation signals or contracted for a lesser number of signals. The circuit includes three 2-to-1 multiplexors 200–202, three two-input comparators 205–208 and a ROM 210. Two estimation signals ED1 and ED2 are applied to the two input ports of multiplexor 200 and to the two input ports of comparator 205. Comparator 205 produces an output on connection C1 which is a logic 1 if signal ED2 is less than ED1 and a zero otherwise. Responsive to the signal on connection C1, multiplexor 20D passes the smaller of signals ED1 and ED2 to one input port of multiplexor 201 and one input port of comparator 206. Estimation signal ED3 is applied to the second input ports of multiplexor 201 and comparator 206. Comparator 206 produces a signal on connection C2 which is a logic 1 if signal ED3 is less than the signal from multiplexor 200 and a logic zero otherwise. Responsive to the signal on connection C2 multiplexor 201 passes the lessor of the two estimation signals applied to its input ports to one input port of multiplexor 202 and one input port of comparator 207. Estimation signal ED4 is applied to the second input ports of multiplexor 202 and comparator 207. Comparator 207 outputs a logic 1 on connection C3 if signal ED4 is the lesser of the signals applied to comparator 207 and a zero otherwise. Responsive to signal C3 multiplexor 202 passes the smaller of the estimation signals applied to its input ports to one input port of comaprator 208. Estimation signal ED5 is applied to the second input port of comparator 208 which outputs a logic one on connection C4 if signal ED5 is the smaller of the two signals and a zero otherwise.

The output signals from comparators 205–208 are applied to ROM 210 which produces a three bit output code indicating which estimation signal is the smallest. FIG. 12B indicates one manner in which the ROM may be encoded wherein the ROM output represents in binary form the number of the smallest estimation signal e.g. a binary 1 for signal ED1 or a binary 5 for signal ED5. Note, however, that ROM 210 may be eliminated by incorporating the appropriate decoding in multiplexors 14 and 149 of FIGS. 2 and 11 respectively. It should also be appreciated that to accommodate inherent delays in the comparator circuits that the successive comparators and multiplexors may have to be oeprated in "pipelined" fashion for particular applications.

If two of the estimation signals are equal in general it does not matter which is selected by a particular comparator and passed by the corresponding multiplexor. However, if all of the estimation signals are equal and of relatively large value, indicating poor correlation of signal between lines of video signal it may be preferrable to default to a particular filter funciton. In the apparatus of FIG. 12A the system defaults to the filter function corresponding to estimation signal ED1. This occurrs because for signals ED1 and ED2 being equal, comparator 205 generates a logic zero output and multiplexor 200 passes signal ED1. Signals ED1 and ED3 being equal comparator 206 produces a logic zero output and multiplexor 201 passes signal ED1, etc. Therefore, the preferred default function for equal estimation signals is arranged to be associated with the input position indicated as ED1 in FIG. 12A.

The disclosed and claimed apparatus is equally applicable to PAL systems. The only difference being that the lines of video to be combined to generate comb filtered signals must be separated in integral multiple of two lines, i.e. for a line comb filter the appropriate lines employed are lines n and (n+2) or lines n and (n−2). Thus, the detection circuit will operate on signal from lines separated by two line intervals.

In the following claims the term "cross differences" is defined as the differences between diagonally separated samples from different video lines separated by an integral number of horizontal lines. The samples from which the cross differences are developed will normally occur on either side of the pixel for which separated luminance and chrominance signals are currently being developed.

What is claimed is:

1. Video signal processing apparatus for separating luminance and chrominance signal therefrom including a source of a plurality of video signals respectively displaced in time from each other by integral horizontal line intervals, comprising:

detector means coupled to said source, for generating respective estimation signals developed from sums of cross differences of samples from pairs of said plurality of video signals;

a decoder coupled to said detector means and responsive thereto for generating a control signal indicating which of the respective estimation signals has the smallest value;

means for combining video signals from at least two horizontal lines for producing at least one of said separated luminance and chrominance components; and a multiplexor coupled to said source and said decoder and responsive to said control signal, for selectively applying video signals from said source to said means for combining video signals, the signals applied to said combining means corresponding to signals which produced the estimation signal having the smallest value.

2. The apparatus set forth in claim 1 wherein the detector means includes:

first and second similar delay elements for providing time delays equal to integral periods of one-half chrominance subcarrier periods by substantially less than one horizontal line period;

first and second subtraction circuits having respective subtrahend and respective minuend input ports and having respective output ports;

means for coupling the first delay element between the minuend input ports of the first and second subtraction circuits;

means for coupling the second delay element between the subtrahend input ports of the first and second subtraction circuits;

means for coupling said source to the minuend input of said first subtraction circuit for applying one of said plurality of video signals;

means for coupling said source to the subtrahend input port of said second subtraction circuit for applying another of said video signals;

signal combining means having an output port at which said estimation signal is produced and having first and second input ports; and means for coupling the output ports of said first and second subtraction circuits respectively to said first and second input ports of said signal combining means.

3. The apparatus set forth in claim 2 wherein the means for coupling said subtraction circuits to said signal combining means includes absolute value circuits respectively connected between the output ports of said first and second subtraction circuits and said signal combining means.

4. The apparatus set forth in claim 2 wherein said first and second similar delay elements respectively delay signals applied thereto by one-half chrominance subcarrier periods.

5. The apparatus set forth in claim 2 wherein said first and second similar delay elements respectively delay signals applied thereto by one chrominance subcarrier period.

6. The apparatus set forth in claim 1 wherein the detector means includes:

first, second, third and fourth delay elements having respective input ports and respective output ports, each delay element for delaying signal applied thereto by one-half chrominance subcarrier period, said first and second delay elements being cascade connected with the first element being coupled to said source for applying one of said plurality of video signals thereto, said third and fourth delay elements being cascade connected with the third delay element being coupled to said source for applying another of said plurality of video signals thereto;

first weighting means coupled to the output port of said first delay element, for weighting samples by a constant factor;

second weighting means coupled to the output port of said third delay element, for weighting samples by a constant factor;

signal combining means coupled to the first and second weighting means and to the input ports of the first and third delay elements and the output ports of the second and fourth delay elements, for combining signals from the first and second weighting means in a first polarity sense with signals from the input port of the first and third delay elements and the output port of the second and fourth delay elements in a second polarity sense.

7. The apparatus set forth in claim 1 wherein the detector means includes:

first, second, third and fourth delay elements having respective input ports and respective output ports, each delay element for delaying signal applied thereto by one-half chrominance subcarrier period, said first and second delay elements being cascade connected with the first element being coupled to said source for applying one of said plurality of video signals thereto, said third and fourth delay elements being cascade connected with the third delay element being coupled to said source for applying another of said plurality of video signals thereto;

first weighting means coupled to the output port of said first delay element, for weighting samples by a constant factor;

second weighting means coupled to the output port of said third delay element, for weighting samples by a constant factor;

signal combining means coupled to the input ports of the first and third delay elements, the output ports of the second and fourth delay elements and said first and second weighting means, for combining signals from the input port of the first delay element, the output port of the second delay elements and the first weighting means in a negative sense with signals from the input port of the third delay element, the output port of the fourth delay element and said second weighting means in the positive sense.

8. Video signal processing apparatus for separating luminance and chrominance components including a source of a plurality of video signals respectively displaced from each other by integral horizontal line intervals comprising means coupled to said source for developing sample sums corresponding to cross differences of signal samples from pairs of said plurality of video signals and comparing said sample sums for determining the pairs of video signals having the highest correlation about successive sample points, and means coupled to said source and responsive to the means for developing and comparing for selectively combining the video signals exhibiting the highest correlation to produce comb filtered separated luminance and chrominance signals.

9. The apparatus set forth in claim 8 wherein the means for developing and comparing sample sums corresponding to cross differences includes:

first and second similar delay elements for providing time delays equal to integral periods of one-half chrominance subcarrier periods by substantially less than one horizontal line period;

first and second subtraction circuits having respective subtrahend and respective minuend input ports and having respective output ports;

means for coupling the first delay element between the minuend input ports of the first and second subtraction circuits;

means for coupling the second delay element between the subtrahend input ports of the first and second subtraction circuits;

means for coupling said source to the minuend input of said first subtraction circuit for applying one of said plurality of video signals;

means for coupling said source to the subtrahend input port of said second subtraction circuit for applying another of said video signals;

signal combining means having an output port at which said estimation signal is produced and having first and second input ports; and means for coupling the output ports of said first and second subtraction circuits respectively to said first and second input ports of said signal combining means.

10. The apparatus set forth in claim 8 wherein the means for developing and comparing sample sums corresponding to cross differences includes:

first, second, third and fourth delay elements having respective input ports and respective output ports, each delay element for delaying signal applied thereto by one-half chrominance subcarrier period, said first and second delay elements being cascade connected with the first element being coupled to said source for applying one of said plurality of video signals thereto, said third and fourth delay elements being cascade connected with the third delay element being coupled to said source for applying another of said plurality of video signals thereto;

first weighting means coupled to the output port of said first delay element for weighting samples by a constant factor;

second weighting means coupled to the output port of said third delay element for weighting samples by a constant factor;

signal combining means coupled to the first and second weighting means and to the input ports of the first and third delay elements and the output ports of the second and fourth delay elements for combining signals from the first and second weighting means in a first polarity sense with signals from the input port of the first and third delay elements and the output port of the second and fourth delay elements in a second polarity sense.

11. The apparatus set forth in claim 8 wherein the means for developing and comparing sample sums corresponding to cross differences comprises:

first, second, third and fourth delay elements having respective input ports and respective output ports, each delay element for delaying signal applied thereto by one-half chrominance subcarrier period, said first and second delay elements being cascade connected with the first element being coupled to said source for applying one of said plurality of video signals thereto, said third and fourth delay elements being cascade connected with the third delay element being coupled to said source for applying another of said plurality of video signals thereto;

first weighting means coupled to the output port of said first delay element, for weighting samples by a constant factor;

second weighting means coupled to the output port of said third delay element, for weighting samples by a constant factor;

signal combining means coupled to the input ports of the first and third delay elements, the output ports of the second and fourth delay elements and said first and second weighting means, for combining signals from the input port of the first delay element, the output port of the second delay elements and the first weighting means in a negative sense with signals from the input port of the third delay element, the output port of the fourth delay element and said second weighting means in the positive sense.

12. Apparatus for separating luminance and chrominance components of a digital video signal including a plurality of delay elements for providing a plurality of delayed replicas of said digital video signal ones of which are displaced in time from other ones by integral horizontal line periods, and a plurality of signal combining means each respectively coupled to at least two of said plurality of signals for producing a separated luminance or chrominance signal, respective ones of said combining means having detection circuitry associated therewith, said detection circuitry respectively coupled to said plurality of delay elements for providing estimation signals corresponding to the sum of cross differences of video signal samples taken about the samples being combined to produce the separated chrominance or luminance signal, said estimation signals being coupled to a decoder for selecting the luminance signal from the combining means associated with the detection circuitry providing the estimation signal corresponding to the smallest valued sum of cross differences.

13. The apparatus set forth in claim 12 wherein said decoder comprises a multiplexor having at least one output port and a plurality of input ports respectively coupled to said combining means, said multiplexor being responsive to a control input signal for selectively coupling one of said plurality of input ports to said output terminal and means coupled to said plurality of detection circuitry for generating said control input signal.

14. Video signal processing apparatus for separating luminance and chrominance signal components, including a source of a plurality of video signals respectively displaced in time from each other by integral horizontal line intervals, and means responsive to different combinations of said plurality of video signals for producing and from which alternative separated luminance component signals are available, comprising:

means coupled to said source, for generating respective estimation signals developed from sums of cross differences of samples from at least two of said plurality of video signals;

a decoder coupled to said means for generating estimation signals and responsive thereto for generating control signals indicative of the sum of cross differences having the smallest value; and means coupled to said decoder and responsive to said control signal for selecting one of said alternate separated luminance component signals.

15. The apparatus set forth in claim 14 wherein the means for generating sums of cross differences includes:

first and second similar delay elements for providing time delays equal to integral periods of one-half chrominance subcarrier periods by substantially less than one horizontal line period;

first and second subtraction circuits having respective subtrahend and respective minuend input ports and having respective output ports;

means for coupling the first delay element between the minuend input ports of the first and second subtraction circuits;

means for coupling the second delay element between the subtrahend input ports of the first and second subtraction circuits;

means for coupling said source to the minuend input of said first subtraction circuit for applying one of said plurality of video signals;

means for coupling said source to the subtrahend input port of said second subtraction circuit for applying another of said video signals;

signal combining means having an output port at which said estimation signal is produced and having first and second input ports; and means for coupling the output ports of said first and second subtraction circuits respectively to said first and second input ports of said signal combining means.

16. The apparatus set forth in claim 15 wherein the means for coupling said subtraction circuits to said signal combining means comprises absolute value circuits respectively connected between the output ports of said first and second subtraction circuits and said signal combining means.

17. The apparatus set forth in claim 14 wherein the means for generating sums of cross differences includes:

first, second, third and fourth delay elements having respective input ports and respective output ports, each delay element for delaying signal applied thereto by one-half chrominance subcarrier period, said first and second delay elements being cascade connected with the first element being coupled to said source for applying one of said plurality of video signals thereto, said third and fourth delay elements being cascade connected with the third delay element being coupled to said source for applying another of said plurality of video signals thereto;

first weighting means coupled to the output port of said first delay element, for weighting samples by a constant factor;

second weighting means coupled to the output port of said third delay element, for weighting samples by a constant factor;

signal combining means coupled to the first and second weighting means and to the input ports of the first and third delay elements and the output ports of the second and fourth delay elements for combining signals from the first and second weighting means in a first polarity sense with signals from the input port of the first and third delay elements and the output port of the second and fourth delay elements in a second polarity sense.

18. The apparatus set forth in claim 14 wherein the means for generating sums of cross differences includes;

first, second, third and fourth delay elements having respective input ports and respective output ports, each delay element for delaying signal applied thereto by one-half chrominance subcarrier period, said first and second delay elements being cascade connected with the first element being coupled to said source for applying one of said plurality of video signals thereto, said third and fourth delay elements being cascade connected with the third delay element being coupled to said source for applying another of said plurality of video signals thereto;

first weighting means coupled to the output port of said first delay element, for weighting samples by a constant factor;

second weighting means coupled to the output port of said third delay element, for weighting samples by a constant factor;

signal combining means coupled to the input port of the first and third delay elements, the output ports of the second and fourth delay elements and said first weighting means for combining signals from the input port of the first delay element, the output port of the second delay elements and the first weighting means in a negative sense with signals from the input port of the third delay element, the output port of the fourth delay element and said second weighting means in the positive sense.

19. Video signal processing apparatus for selecting one of a plurality of video signals corresponding to a video signal and delayed replicas thereof, comprising:

delay means having an input terminal for applying said video signal and a plurality of output terminals from which replicas of said video signal are available, pairs of said replicas corresponding to image pixels symmetrically disposed about an image point;

detection means, coupled to said delay means, for generating respective estimation signals, each of said estimation signals corresponding to the sum of differences between the signals of one pair of replicas and the signals of at least a second pair of replicas and wherein the signals contributing to each of said differences correspond to oppositely disposed pixels relative to said image points;

means coupled to said detection means and responsive to said estimation signals for selecting one of said plurality of video signals associated with the pairs of said replicas which generates the estimation signal corresponding to the smallest sum of differences.

* * * * *